3,106,472
METHOD OF TREATING EDIBLE OILS AND GREASES
Robert E. O'Brian and Mabel D. O'Brian, both of 1754 Mar Ella Trail, Des Moines, Iowa, and Edward D. O'Brian, 910 Iroquois Ave., Anaheim, Calif.
No Drawing. Filed Oct. 11, 1960, Ser. No. 61,813
9 Claims. (Cl. 99—118)

This invention pertains to a new and improved method of treating edible greases and oils, and to the products resulting from the use of this method.

It is well known that the taste of fried products is affected by specific greases and oils. In manufacturing certain types of products such as potato chips it is customary to use corn oil because of the flavor characteristics of this material. Unfortunately such use at the present time has forced the price of corn oil to a comparatively high level compared to the price level of other oils and greases such as cotton seed oil and various animal fats.

An object of the present invention is to provide a method for "up-grading" such other oils and greases, so as to alter their flavor characteristics in such a way as to make them more acceptable for use in frying foods such as potato chips, than they are at the present. A related object of this invention is to provide a method for imparting a certain amount of corn oil flavor to such other oils and greases. A further object of this invention is to provide oils and greases having flavor characteristics, which are related to the flavor of corn oil.

Various other objects of this invention as well as many advantages of it will be apparent to those skilled in the field of edible oil treatment from a study of this specification.

As an aid to understanding this invention it may be stated essentially in summary form that it concerns the extraction of water soluble ingredients from corn cobs and the transfer of such ingredients to liquid, edible oils and greases.

At the present time it is preferred to practice this invention by treating cotton seed oil such as the "refined" cotton seed oil commercially sold for food use. This invention can be utilized with other edible oils and greases such as soy bean oil, sunflower seed oil, olive oil, coconut oil, lard and other edible rendered animal fats and vegetable oils. It can also be employed with various purified fatty acids or fatty acid fractions. All of these materials are either liquid at room temperature or can be made liquid by heating. Further, all of these materials do not noticeably decompose or similarly react at about 100 degrees C.

The corn cobs used in carrying out the process herein described can be obtained from virtually any source. Such cobs should be relatively "fresh," not having been exposed after shelling to the action of air and rain and snow. No differences in results have been noted where corn cobs from different areas or from different types of corn have been employed. It is believed that some minor differences in results should be apparent when such different cobs are used, but at the present time they have not been observed.

Such cobs should, of course, be relatively free from various farm type contaminates and from dirt. If desired they may be washed with cold or room temperature water prior to being used in this process. Preferably such cobs are initially reduced in size to cubes or chunks corresponding in size to one half inch cubes. Further reduction in size in this is not considered to improve or detract from the results achieved. Larger chunks of corn cobs than this; or, even whole corn cobs can be employed in accordance with this invention. It is presently believed that this latter is undesirable because of difficulties in removing water soluble ingredients from such larger bodies in the initial step in the process of this invention.

This initial step includes the extraction from corn cob material of such ingredients. The chemical nature of these edible ingredients is not now known to the inventors named herein. It is presumed that these ingredients are in the nature of volatile essential oils and they are at least partially destroyed at elevated temperatures in excess of about 200 degrees C.

If desired the extraction referred to above can be carried out by mixing water and cob material together in an open vessel and heating. This is not preferred because of the tendency of edible flavoring ingredients to vaporize from such an open vessel and because of the time required to effectively remove substantially all of such ingredients from cob material. Instead it is preferred to "cook" such a mixture under pressure at temperatures of from about 100 degrees C. to about 200 degrees C.

The extraction of ingredients during this step is essentially of a time-temperature dependent nature. The higher the temperature employed the shorter the time required. In general the extraction should be of limited duration, and should be carried out only to the extent necessary to remove from the cob material ingredients which do not have an unpleasant, bitter like taste. Such undesirable ingredients apparently are less soluble than the flavor forming ingredients having a pleasant corn like flavor and, hence, tend to go into solution only after the desired ingredients have been extracted.

Effective results have been achieved at extracting under 5 p.s.i.g. steam pressure for a period of thirty minutes; 10 p.s.i.g. steam pressure for a period of forty-five minutes; 15 p.s.i.g. steam pressure for a period of one hour; and so on. Longer extractions than these at the temperatures corresponding to these steam pressures are considered undesirable for the reasons set forth in the preceding paragraph.

Apparently the quantity of cob material present per unit quantity of water in this initial extraction step is unrelated to the extraction of undesired, bitter-type flavor forming ingredients. However, the quantity of cob material present per unit of quantity of water is considered to be important in obtaining a satisfactory quantity of desired flavor forming ingredients from the cob material in a solution form in which these ingredients may be transferred to oil during the second step employed in practicing this invention.

Preferred results have been presently achieved by using from about 12 to about 24 ounces of ½ inch cube-like chunks of corn cobs per 1½ gallons of water in this initial step. If less cob material is used the solution resulting from the initial step appears to be too weak for effective flavoring of oil. On the other hand, a greater quantity of cob material than is specified in this range appears not to improve the results achieved. This is considered to be a consequence of a type of saturation effect. Apparently water can hold in solution only a limited quantity of desired flavor forming ingredients as are extracted during this initial extraction step.

Following the initial extraction step the solution obtained is separated from the spent cob material. In general, any convenient straining, filtering or decanting procedure can be used for this operation. Further, such separation may be carried out with the water either at an elevated temperature immediately below boiling, or may be carried out at room or lower temperatures, or, of course, any temperature within this range. At the present time it is preferred to separate the solution resulting from this extraction step under such conditions that at least some liquid remains in the spent cob material. This is considered to aid in holding within the spent cob material unpleasant, bitter-like taste forming ingredients which might otherwise be removed through the use of extreme pressure tending to force all liquid from the cob material. When the 1½ gallons of water are treated as specified above with from about 12 to about 24 ounces of cob material about one gallon of solution is normally obtained when the operation is carried out by straining. The loss in water apparently is largely represented by liquid absorbed by the corn cob material itself.

The solution achieved by the initial extraction step above is, in accordance with the broad teachings of this invention, located within a vessel beneath a layer of an appropriate vegetable oil or meat fat material and these two mixtures are processed so as to cause the water present to vaporize. When this is done by raising the temperature to about 100 degrees C. and fatty acid material will segregate into a separate layer completely covering the solution from the extracting step. When this step is carried out by applying heat to the water layer vaporization will occur, and water in the form of steam will constantly escape upwardly through the so-called oil layer in the form of bubbles. It is presently believed that preferred results can be achieved by minimizing the size of such bubbles through the use of boiling chips or the like.

Essentially this last operation, which for convenience of discussion, is termed the "flavoring operation," is in the nature of a gas-liquid contact operation in which fatty acid material is scrubbed by steam under such conditions that it is considered that any volatile, desired flavor forming ingredients removed from the cob material are imparted to the fatty acid material. It is considered that such ingredients are either placed in solution within the oil or fatty acid type of material and/or are absorbed by such material. It is entirely possible however, that at least part of such ingredients escape to the atmosphere. This will be particularly the case with flavor forming ingredients which are of a type which is relatively insoluble in a fatty acid solvent.

It is believed that the thickness of the oil layer on top of the water during this flavoring step is important in achieving satisfactory results since what is involved during this flavoring operation is essentially scrubbing of oil with water vapor. Thus, for example, it is believed that a ¹⁄₁₆ inch thick layer of oil would not be satisfactorily flavored in accordance with this invention to the same extent that the same oil could become flavored when located in a much thicker layer during this operation. Effective results have been achieved by boiling a solution from the extracting operation through a layer of oil of from about 2 to about 5 inches thick. Presumably thicker layers of oil could be employed.

Although it is presently preferred to carry out this flavoring operation in an open kettle by applying heat to water various other equivalents can be employed. Thus, for example, it is possible to carry out this flavoring step in a closed vacuum vessel and to exhaust from the top of such a vessel through the use of a vacuum so as to cause the water beneath an oily layer to vaporize at a comparatively lower temperature. Obviously heat can be employed when this vacuum method of flavoring is utilized. Similarly the flavoring operation specified herein can be carried out by countercurrent contact of vapors from a solution from the extraction step with oily material.

When the flavoring operation is carried out in the presently preferred open kettle method comparatively little in the way of equipment investment is required. It is to be noted that this open kettle method contains a built-in safeguard against overheating which might tend to destroy relatively temperature sensitive flavoring ingredients because of the constant vaporization of water. Such vaporization of water maintains a relatively constant temperature of about 100 degrees C. throughout the entire flavoring operation. Indeed, it is preferred to control this open kettle type of flavoring step by means of a thermometer and to stop the application of heat to the vessel employed, when the temperature suddenly starts to rise from 100 degrees C. Such a rise in temperature indicates the vaporization of water within the water layer employed during this flavoring operation.

It is not considered, however, to indicate the complete absence of water in the oily material remaining from the flavoring operation. Apparently small quantities of water are entrapped or held within this oily material. Such small quantities of water can at least largely be removed by merely holding the resultant remaining oily material at an elevated temperature of from about 100 degrees C. to 110 degrees C. for a short period of at least five minutes. During such a period a series of small bubbles apparently containing water separate out and break up at the top of the oily material.

This flavoring operation need not be carried out to a point where all water from the extraction step is removed by vaporization and by the method indicated in the preceding paragraph. However, it is presently preferred to carry out the flavoring step so that substantially all water is lost in the form of vapor in order to make certain that all desired flavor forming ingredients carried over from the extraction step are imparted to the oily material treated during the flavoring operation. Apparently such imparting of flavor forming ingredients to the oily material gives rise to a very small amount of tar-like substance. This substance normally only becomes apparent to the eye during the last stages of water removal during the flavoring operation. It normally tends to float upon the oily material and to collect around the edges and in the center of the surface of the oily material. It may be conveniently removed from the fatty acid containing material treated in this flavoring operation in any convenient manner.

The amount to which any vegetable oil or fatty animal material is flavored in accordance with this invention will, of course, depend upon the amount of material from the extraction step contacted with it as well as the concentration of such material. Particularly satisfactory results have been achieved in flavoring oils and greases by contacting one gallon of such fatty acid material with from about 1 quart to about 1 gallon of solution from the extraction step formed as indicated in the preceding discussion. Particularly favorable results have been achieved by treating the 1 gallon of fatty acid material with about ½ gallon of such solution. These values are all based upon the flavoring operation being carried out by what has been referred to as the "open kettle method" using a layer of fatty acid material of from about 2 to about 5 inches thick surmounting the water layer employed.

The present invention imparts to various fatty acid materials as indicated in the preceding discussion a certain amount of corn oil type flavor which is very desirable in many types of cooking operations. Thus, for example, potato chips have been cooked in cotton seed oil flavored in accordance with this invention so as to have substantially the same flavor characteristics as when cooked in corn oil. The invention also apparently has a certain amount of debitterizing aspects with various materials such as lard, soy bean oil or the like. With this invention a certain favorable debitterizing of the flavor of such oils has been observed along with a tendency to impart to such materials at least a slight corn oil flavor. It is to be emphasized that in this field, precise quantitative and qualitative analysis of the results achieved is impossible because of the fact that no accurate, consistent means are presently known for measuring flavor and olfactory characteristics.

The following specific examples are given as an aid to understanding the present invention. These examples are not to be considered as limiting the present invention inasmuch as they are solely of an explanatory nature and are intended so as to set forth certain presently preferred modes of practicing this invention.

*Example I*

A steam pressure cooker was charged with 1½ gallons tap water, 12 ounces corn cobs, ground so as to correspond to ½ inch cubes of cob material, and was closed and heated to a pressure within the vessel of 15 p.s.i.g. This pressure was maintained for 30 minutes. At the end of this period the temperature was allowed to cool and the cob material was strained off the resultant solution. One quart of the resultant solution was then placed in a common household kettle about 14 inches in diameter and was covered with one gallon of commercial edible cotton seed oil. Moderate heat was applied so as to bring the temperature of the oil and water to about 100 degrees C. This heat was continued up until a sharp rise in temperature was noted. At this point the heat was reduced so as to maintain the temperature of the oil at about 110 degrees C. for a period of about five minutes. At the end of this period the heat was cut off and upon cooling a small amount of tarry residue was separated. The resultant oil was then ready for use.

*Example II*

The procedure set forth in Example I was followed using during the extraction step 1½ gallons tap water and 24 ounces ground corn cob material. During this extraction step the pressure within a vessel of 10 p.s.i.g. was maintained for a period of 45 minutes. The flavoring step was carried out as in Example I using ½ gallon of the soluiton from the extraction step.

*Example III*

The procedure set forth in Example I was followed using 1½ gallons tap water, 18 ounces of whole corn cobs, and maintaining the pressure cooker at 5 p.s.i.g. for a period of one hour. One gallon of the resultant solution was utilized during the flavoring operation.

As further examples of this invention the process set forth in the preceding Examples I, II, and III can be carried out substituting for the cotton seed oil specified soy bean oil, lard, or rendered pork fat (other than lard).

We claim:
1. A process for treating edible fatty acid material which comprises:
    contacting about 12 to about 24 oz. corn cob material with about 1½ gal. water at a temperature of at least 100° C. for a time sufficient to extract from said cob material edible flavoring ingredients located therein without the removal of cob material ingredients having an unpleasant, bitter-like taste so as to prepare an aqueous solution containing flavor forming ingredients from said cob material;
    vaporizing substantially all of said aqueous solution so that vapors therefrom come in direct contact with edible fatty acid material so that volatile, flavor forming ingredients removed from said cob material are imparted to said fatty acid material, said contact causing flavor forming ingredients from said aqueous solution to alter the flavor of said fatty acid material.

2. A process for treating edible fatty acid material as defined in claim 1 wherein said corn cob material comprises particles of corn cobs corresponding in size to cubes of about ½ inch dimension.

3. A process for treating edible fatty acid material as defined in claim 1 wherein said treating is carried out under pressure at a temperature corresponding to steam pressure of from about 5 to 15 p.s.i.g. for a period of from about thirty minutes to about one hour.

4. A process for treating edible fatty acid material as defined in claim 1 wherein said vaporization is accomplished by locating said fatty acid material in liquid form above said aqueous solution and applying heat to said aqueous solution so as to vaporize the same.

5. A process for treating edible fatty acid material as defined in claim 4 wherein said fatty acid material is located in a layer of from about two-five inches thick on said aqueous solution.

6. A process for treating an edible fatty acid material as defined in claim 4 wherein of from about one quart to about one gallon of said aqueous solution is vaporized per gallon of edible fatty acid material.

7. A process for treating edible fatty acid material as defined in claim 1 wherein said fatty acid material is a vegetable oil.

8. A process for treating edible fatty acid material as defined in claim 7 wherein said vegetable oil is cotton seed oil.

9. A process for treating edible fatty acid material as defined in claim 1 wherein said edible fatty acid material is animal fat.

References Cited in the file of this patent
UNITED STATES PATENTS

| | | |
|---|---|---|
| 1,140,629 | Sulzberger | May 25, 1915 |
| 2,273,062 | Musher | Feb. 17, 1942 |
| 2,554,871 | Musher | May 29, 1951 |